Feb. 18, 1930.　　　L. T. MART　　　1,747,452
COOLING TOWER
Filed Oct. 17, 1927

INVENTOR
Leon T. Mart,
BY Thorpe & Thorpe,
ATTORNEY.

Patented Feb. 18, 1930

1,747,452

UNITED STATES PATENT OFFICE

LEON T. MART, OF KANSAS CITY, MISSOURI

COOLING TOWER

Application filed October 17, 1927. Serial No. 226,667.

This invention relates to cooling towers and has for its object to produce a spray tower having an elevated louvered bottom of simple and strong construction so made that air may freely pass upwardly therethrough over the entire area of the tower, as it has been found in louvered towers, wind blowing from one direction will be so moisture laden before it has been contacted with the spray on the far side of the tower that practically no cooling by evaporation is effected. The prime object of the invention, therefore, is to insure the entry of unsaturated air throughout the entire body of sprayed water, through the side louvers and also through the bottom of the tower to insure the greatest possible cooling of the liquid spray, in combination with a water spray system which is depended upon to break up the water in very fine particles, rather than using baffles, decks, or the like.

Another object is to produce an apparatus of the character outlined of strong, durable, simple, efficient and inexpensive character; and in order that it may be fully understood, reference is to be had to the accompanying drawing, in which.

Figure 1:
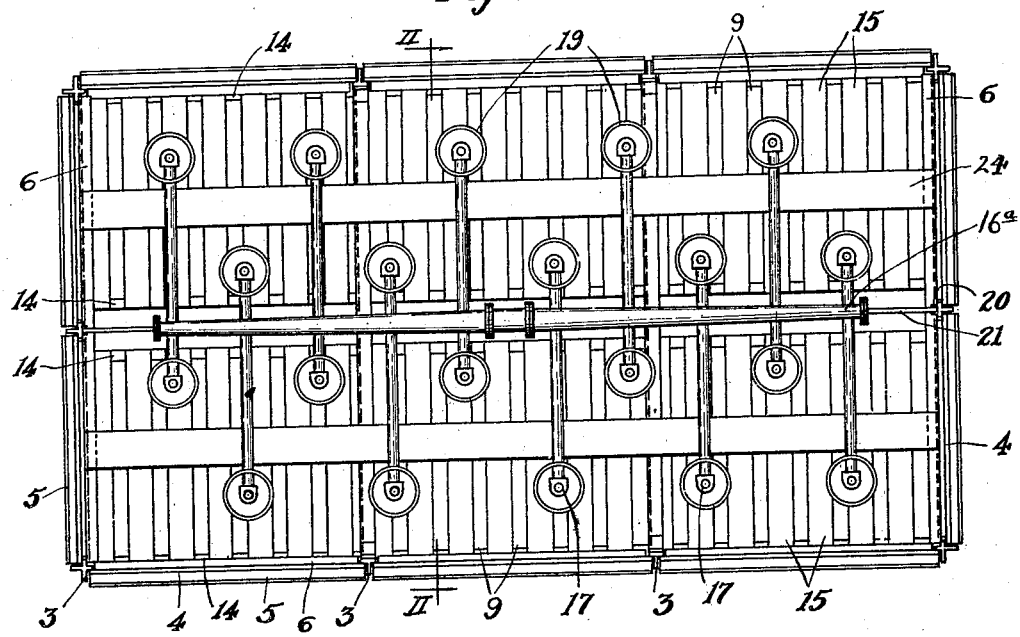
Figure 1 is a top plan view of a cooling tower embodying the invention.

In the said drawing where like reference characters identify corresponding parts in all of the figures, 1 indicates a suitable pond or catch basin on the foundation of which are erected a series of spaced louver posts 2 and superposed louver posts 3, the superposed posts 3 adjacent their upper ends supporting a closed fence 4 for a purpose which will hereinafter appear. It will be understood that although a rectangular tower is illustrated, the posts may be arranged in any suitable manner according to circumstances.

Below the solid or closed fence 4, the posts 3 and the upper ends of the posts 2 conjointly support a series of louvers 5, the undermost louver being formed with an extension portion 6 to insure discharge of water within the tower.

Figure 3:
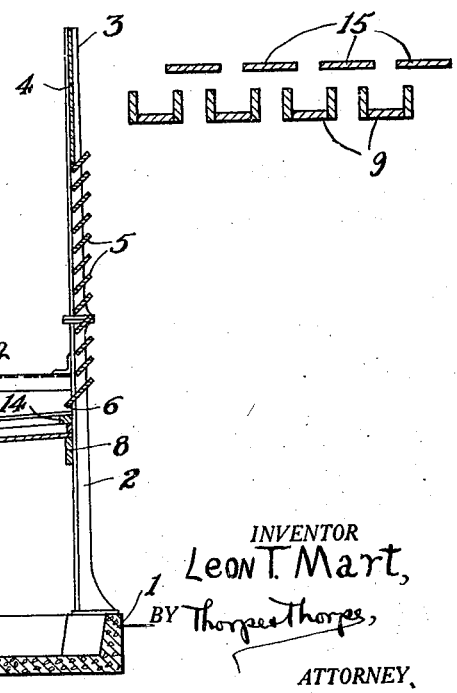
Figure 3 is an enlarged fragmental section through the louvered floor of the tower.

Secured to the posts 2 on opposite sides of the basin 1 and spaced above the same, are horizontal stringers 8, on which the outer ends of a series of spaced troughs 9 are received, said troughs inclining downwardly and inwardly and resting at their inner ends on horizontal girders or supports 10 carried by spaced posts 11 arranged in parallel rows on a base 12 in the center of the basin 1, said posts 11 being equipped with louvers 13. To bridge the space between adjacent troughs 9, a pair of stringers 14 rest on the upper edges of each of said sets of troughs, and mounted on said stringers are baffles 15 having their opposite edges overlapping adjacent troughs as illustrated in Figure 3, so that all water falling vertically or discharged from the undermost louvers shall fall either on a baffle and thence to a trough or directly into a trough, the troughs 9 and baffles 15 thus conjointly providing a louvered floor.

Preferably arranged centrally of the cooling tower is a vertical water supply pipe 16 for the supply of water to be cooled. The pipe 16 feeds a series of spray nozzles 17 suitably arranged within the space surrounded by the louvered fences and supported by branch pipe 16ª, each of said nozzles being equipped with an air circulating sleeve 19. The sleeves 19 are not illustrated in detail as they form the subject-matter of a co-pending application.

Figure 2:
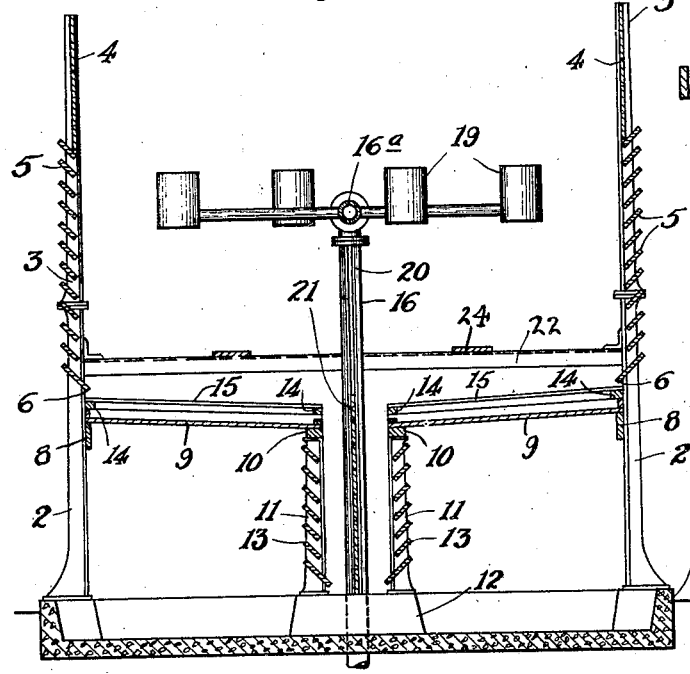
Figure 2 is a section on the line II—II of Figure 1.

In order to prevent a strong wind from blowing water out through the louvers 13 and also to form a baffle or deflector to direct a draft of air upwardly through the louvered floor, a channel 20 is secured to each end post 2—3 in the longitudinal axis of the tower, and to opposite sides of the water supply pipe 16. Slidingly received within said channels are a series of boards or baffles 21, the lowermost board resting upon the base 12 as shown in Figure 2, and being extended vertically to any desired height.

From a consideration of the drawing in connection with the above description, it will be apparent that all water will be finally discharged by the troughs 9 into the central water passageway provided between the two sets of louvers 13 to the catch basin 1, and that by permitting the air to enter the bottom of the tower a more perfect contact of dry air and water is insured thus more efficiently evaporating and cooling the water discharged by the spray nozzle.

In order to properly brace the cooling tower, a series of cross girders 22 connect the oppositely disposed posts 3. The girders 22 are preferably placed at such a height that they may be used to support runways 24 extending for the full length of the cooling tower and so located that an operator may conveniently reach the spray nozzles 17 and sleeves 19 for the adjustment thereof.

From the above description, it will be apparent that I have produced a structure of the character outlined which possesses all of the features of advantage pointed out as desirable; and while I have described and claimed the preferred embodiment of the same, it is to be understood that I reserve the right to make all such changes properly falling within the spirit and scope of the appended claims.

I claim:

1. In a cooling tower, a catch basin, a spray nozzle above said basin, a connection for supplying liquid to said nozzle, a fence surrounding the nozzle, a louvered floor interposed between the catch basin and nozzle, a louvered liquid passageway connecting said floor and basin, and a solid partition longitudinally bisecting said passageway.

2. In a cooling tower, a catch basin, a spray nozzle above said basin, a connection for supplying liquid to said nozzle, a fence surrounding said spray nozzle and providing an enclosure therefor, a support extending across said enclosure from end to end and spaced from the sides thereof and being in a horizontal plane between the nozzle and the basin, a louvered floor having its opposite ends respectively carried by said fence and the support, and a liquid passageway connecting said basin and louvered floor.

3. In a cooling tower, a catch basin, a spray nozzle above said basin, a connection for supplying liquid to said nozzle, a fence surrounding said spray nozzle and providing an enclosure therefor, a support extending across said enclosure from end to end and spaced from the sides thereof and being in a horizontal plane between the nozzle and the basin, a liquid passageway extending upwardly from said catch basin, a series of spaced troughs having their opposite ends respectively carried by the fence and the support and having their discharge ends communicating with said liquid passageway, and a series of baffles bridging the space between adjacent troughs.

4. In a cooling tower, a pair of parallel rows of spaced posts, louver fences carried by said posts, a spray nozzle between said fences, a horizontal support extending parallel to and spaced from said fences and forming the mouth of a liquid-collecting passageway, a series of troughs having their opposite ends respectively carried by the fences and by the horizontal support, and baffles spaced above and bridging the space between adjacent troughs.

In testimony whereof I affix my signature.

LEON T. MART.